United States Patent
Urhahne

(10) Patent No.: US 10,494,024 B2
(45) Date of Patent: Dec. 3, 2019

(54) PARKING ASSISTANT FOR AUTOMATIC FORWARD OR REVERSE PARKING

(71) Applicant: FORD GLOBAL TECHNOLOGIES, LLC, Dearborn, MI (US)

(72) Inventor: Joseph Andreas Urhahne, Pulheim NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/695,583

(22) Filed: Sep. 5, 2017

(65) Prior Publication Data

US 2018/0065665 A1 Mar. 8, 2018

(30) Foreign Application Priority Data

Sep. 5, 2016 (DE) .................. 10 2016 216 754

(51) Int. Cl.
*G08G 1/123* (2006.01)
*B62D 15/02* (2006.01)
(Continued)

(52) U.S. Cl.
CPC ....... *B62D 15/0285* (2013.01); *G05D 1/0246* (2013.01); *G05D 1/0272* (2013.01); *G06K 9/00798* (2013.01)

(58) Field of Classification Search
CPC ............. B62D 15/0285; G05D 1/0246; G05D 1/0272; G06K 9/00798; B60W 2040/0872;
(Continued)

(56) References Cited

U.S. PATENT DOCUMENTS 8,818,725 B2 * 8/2014 Ricci ................. H04W 4/90
701/519
8,922,393 B2 * 12/2014 Ricci ................. H04W 4/90
340/932
(Continued)

FOREIGN PATENT DOCUMENTS

DE 102008051982 A1 6/2009
DE 102011084366 A1 4/2013
(Continued)

OTHER PUBLICATIONS

Moon et al., A trajectory planning method based on forward path generation and backward tracking algorithm for Automatic Parking Systems, 2014, IEEE, p. 719-724 (Year: 2014).*
(Continued)

*Primary Examiner* — McDieunel Marc
(74) *Attorney, Agent, or Firm* — Franklin A. MacKenzie; Brooks Kushman P.C.

(57) ABSTRACT

A motor vehicle is automatically forward or reverse parked into a perpendicular or transverse parking space. After the driver has stopped the motor vehicle, ahead of the parking space in a position that appears suitable to him/her for a direct parking procedure, has exited the motor vehicle and has started the method via a remote control, according to the disclosure the vehicle is automatically allowed to drive a short distance straight ahead. During the short distance of straight-ahead travel, the parking-space gateway is ascertained via an environment sensor system, from which a parking trajectory is calculated. At the end of the short distance of straight-ahead travel, the motor vehicle stops automatically and steers the front wheels into a position corresponding to the calculated parking trajectory.

18 Claims, 2 Drawing Sheets

(51) Int. Cl.
*G05D 1/02* (2006.01)
*G06K 9/00* (2006.01)

(58) Field of Classification Search
CPC .. H04W 4/90; G06F 9/54; G08G 1/16; G08G 1/123; H04L 29/08
See application file for complete search history.

(56) References Cited

U.S. PATENT DOCUMENTS

| | | | |
|---|---|---|---|
| 9,014,911 B2* | 4/2015 | Ricci | H04W 4/90 701/36 |
| 9,043,130 B2* | 5/2015 | Ricci | H04W 4/90 701/301 |
| 9,046,374 B2* | 6/2015 | Ricci | H04W 4/90 |
| 9,105,051 B2* | 8/2015 | Ricci | H04W 4/90 |
| 9,123,058 B2* | 9/2015 | Ricci | H04W 4/90 |
| 9,240,019 B2* | 1/2016 | Ricci | H04W 4/90 |
| 2013/0135118 A1* | 5/2013 | Ricci | H04W 4/90 340/932.2 |
| 2013/0141252 A1* | 6/2013 | Ricci | H04W 4/90 340/932.2 |
| 2013/0144460 A1* | 6/2013 | Ricci | H04W 4/90 701/1 |
| 2013/0144469 A1* | 6/2013 | Ricci | H04W 4/90 701/2 |
| 2013/0144486 A1* | 6/2013 | Ricci | H04W 4/90 701/36 |
| 2013/0268141 A1 | 10/2013 | Du et al. | |
| 2014/0032031 A1 | 1/2014 | Okamura | |
| 2014/0067163 A2 | 3/2014 | Du et al. | |
| 2014/0222252 A1 | 8/2014 | Matters et al. | |
| 2018/0039264 A1* | 2/2018 | Messner | G06K 9/00812 |

FOREIGN PATENT DOCUMENTS

| | | |
|---|---|---|
| DE | 102013214660 A1 | 1/2015 |
| DE | 102015002438 A1 | 9/2016 |
| WO | 2011096938 A1 | 8/2011 |

OTHER PUBLICATIONS

Gupta et al., Autonomous parallel parking system for Ackerman steering four wheelers, 2010, IEEE, p. 1-6 (Year: 2010).*
Vorobieva et al., Automatic Parallel Parking in Tiny Spots: Path Planning and Control, 2014, IEEE, p. 396-410 (Year: 2014).*
Min et al., A control system for autonomous vehicle valet parking, 2013, IEEE, p. 1714-1717 (Year: 2013).*

* cited by examiner

PARKING ASSISTANT FOR AUTOMATIC FORWARD OR REVERSE PARKING

CROSS-REFERENCE TO RELATED APPLICATIONS

This application claims foreign priority benefits under 35 U.S.C. § 119(a)-(d) to DE Application 10 2016 216 754.5, filed Sep. 5, 2016, which is hereby incorporated by reference in its entirety.

TECHNICAL FIELD

The disclosure relates to a method and a parking assistant for automatic forward or reverse parking of a motor vehicle into a perpendicular parking space, or a transverse parking space orthogonal to the direction of the roadway.

BACKGROUND

A method is known from DE 10 2011 084 366 A1, which describes a self-steering parking assistant, also called a garage assistant. After a driver has stopped his/her vehicle close to a desired parking space and has exited the vehicle, he/she starts the automatic parking maneuver, whereupon the parking assistant undertakes the control of the drive, braking, steering and, where appropriate, transmission functions of the vehicle, and parks the vehicle autonomously. In this way, the driver is spared an uncomfortable process of getting in and out of narrow garages, or in other narrow perpendicular or transverse parking spaces.

In the terminology used herein, for the sake of simplicity, the driver will be designated as such also after he/she has got out, but is still located close to the vehicle, even though he/she can then only perform restricted operating functions, for example via a dedicated remote control, a smartphone or a radiofrequency key.

The above parking assistant and similar known parking assistants must have already detected the dimensions of the parking space very precisely before the vehicle is able to drive autonomously into the parking space. This is possible only with elaborate environment sensor systems, for example with a combination of sensors based on ultrasound, radar, laser and/or cameras, a so-called sensor fusion. In the course of longitudinal parking, the capture of the environment ordinarily takes place in the course of a driver-controlled drive past a possible parking space. Precisely how this happens in the case of transverse parking is not disclosed in the generic printed publication, but a procedure similar to that in the case of longitudinal parking is to be assumed—that is to say, a capture of the environment during a driver-controlled approach to a possible parking space. This also corresponds to a method for automatic forward or reverse parking described in DE 10 2008 051 982 A1, wherein the driver stops and exits the vehicle only when the parking space has been recognized to be appropriately dimensioned.

SUMMARY

The object underlying the disclosure is to specify a method that is particularly convenient and useful for the driver for automatic forward or reverse parking of a motor vehicle into a perpendicular or transverse parking space and that, moreover, makes do with an environment sensor system that is not very elaborate.

In the case of the disclosure, the driver of the vehicle brings the vehicle, as usual, ahead of the parking space into a sensible position—that is to say, into a position that appears suitable to him/her for a direct parking procedure—that is to say, one that is possible in one movement without maneuvering back and forth—specifically either forwards or in reverse, depending upon whether the vehicle is to be parked front first or rear first. In this case, the driver does not have to be mindful of whether and how the front wheels have been locked. In addition, the parking assistant—unlike in the prior art—is not yet active at this time.

The driver then exits the vehicle and starts the parking assistant via a remote control, which may be a simple dedicated device but, for example, may also be realized via an app of a smartphone, or in a radiofrequency key for the vehicle. The driver must of course be located close to the vehicle, in order to have control over the parking process at all times.

The parking assistant now lets the vehicle drive automatically a few meters straight ahead by setting the front wheels of the vehicle precisely to straight-ahead travel. During this straight-ahead travel, the parking assistant does not yet know where the ride is to go precisely, but the environment sensor system is already operating, insofar as it prevents the vehicle from running into an obstacle. Should an obstacle be in the way, the vehicle stops a short distance ahead of it, by which the driver can already discern that the automatic parking maneuver is not possible in this way, in which case he/she can also receive this feedback in some other way. The vehicle also stops if the vehicle has traveled a preset maximum distance of several meters straight ahead. The vehicle can also stop as soon as the environment sensor system has ascertained the parking-space gateway precisely enough.

From the dimensions of the parking-space gateway ascertained during the short distance of straight-ahead travel, a parking trajectory is calculated, in accordance with which the motor vehicle subsequently moves automatically into the parking space, as is known, by the steering and the drive being controlled appropriately.

The automatic straight-ahead travel makes it possible for the environment sensor system to ascertain the parking-space gateway in relation to the vehicle quickly with little computational effort and with acceptable uncertainties. It has become evident that in the case of perpendicular or transverse parking spaces a very simple environment sensor system suffices to implement the method according to the disclosure. For example, simple ultrasonic sensors such as are used in order to warn drivers of obstacles in the travel path in the course of maneuvering, have only a very limited range of at most about 2 or 3 meters. Such a limited sensor range is also sufficient because the driver has opportunity to appraise the situation also from outside the vehicle before he/she starts the parking maneuver, and of course the remote control also allows the driver to abort the method at any time, as is known as such.

In the case of the disclosure, the entire automatic parking maneuver is subdivided into two phases, namely a measuring ride precisely straight ahead, in the course of which the parking destination is ascertained, and the subsequent parking ride subject to automatic steering.

The straight-ahead ride and the subsequent parking ride corresponding to the parking trajectory are implemented very slowly, preferentially at less than 2 km/h. In addition, the driver should be able to stop the automatically driving vehicle at any time. As confirmation that the driver is aware that an automatic parking maneuver is being implemented, there may be provision that the driver has to keep pressed the button on the remote control with which he/she starts the automatic parking maneuver; otherwise the vehicle is stopped immediately. Alternatively, there may be provision that the vehicle is stopped immediately if the driver presses this button once again.

There may also be provision that the driver has to give a dedicated command, by pressing a button or otherwise, to continue the automatic parking maneuver when the vehicle stops after the short distance of straight-ahead travel.

All these cases can be realized with only two buttons on the remote control: one for forward parking, and one for reverse parking.

In the case of the disclosure, the function of the driver is not restricted simply to starting the automatic parking maneuver; rather, a repeated collaboration takes place that, in the final analysis, eases the burden on the driver. Firstly, the driver already assists the system by virtue of the fact that he/she steers toward a perpendicular or transverse parking space as usual in a sensible manner. But in this case, he/she does not have to think about activating a parking assistant at the right time or about approaching the parking space relatively uniformly and slowly in order that the parking assistant can correctly scan the parking space, as in the prior art.

Secondly, a driver located outside the vehicle can monitor the automatic parking maneuver and can, of course, also bring the vehicle into a very narrow parking space in which the doors of the vehicle cannot be opened wide.

Thirdly, by virtue of the stop after the straight-ahead ride the vehicle acknowledges to the driver that everything is in order and that it will or can continue the ride, and thereby appeals to the driver to perform another visual inspection.

During the stop after the straight-ahead ride, the parking assistant can still verify whether the parking-space dimensions detected by sensor means at a standstill match the parking-space gateway detected during the straight-ahead ride. If so, the vehicle can set itself in motion again immediately, in order to drive into the parking space without the driver having to confirm this once again.

After the vehicle has parked in the parking space, it can acknowledge this to the driver via flashing signals.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
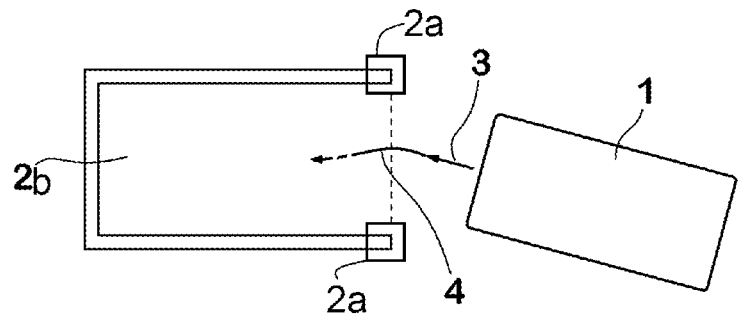
FIG. 1 depicts a schematic top view of a motor vehicle ahead of a perpendicular parking spot.

FIG. 1 shows, schematically, a typical situation in which a vehicle 1 has been stopped, ready to be parked, ahead of a perpendicular or transverse parking space 2b that in this example has been represented as a parking spot bounded on all sides in a garage, but, for example, may also be a sufficient gap between two other vehicles or between any other parking-area boundaries. The vehicle 1 is provided with short-range ultrasonic sensors by way of environment sensor system for a parking assistant.

After the driver has stopped the vehicle 1 in the position shown ahead of the parking space 2b and has started the method, the front wheels of the vehicle 1 are automatically set precisely to straight-ahead travel, and the vehicle 1 automatically implements a straight-ahead ride 3 having a predetermined maximum length, which in FIG. 1 is a first arrow-indicated section of a trajectory represented by two successive arrows, and then stops briefly. This stop corresponds in FIG. 1 to the point of the arrow of the straight-ahead ride 3.

During the short distance of straight-ahead travel 3, the parking-space gateway 2a is ascertained via an environment sensor system of the vehicle 1, from which a parking trajectory 4 is calculated as a second section of the overall trajectory, along which the vehicle 1 then drives into the parking space 2b, subject to automatic steering of the front wheels.

During the short halt between the straight-ahead ride 3 and the parking ride corresponding to the parking trajectory 4, a check is made as to whether the dimensions of the parking space 2b currently detected by sensors match the parking-space gateway 2a detected during the straight-ahead ride 3.

Figure 2:
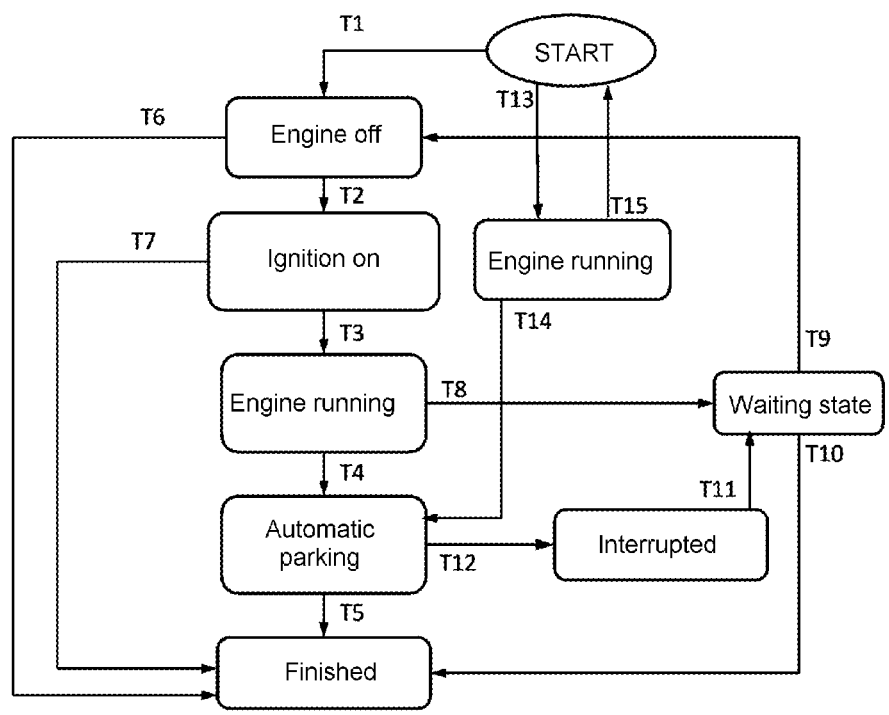
FIG. 2 depicts an overall block diagram of operating states of a motor vehicle with a parking assistant, and possible transitions between the operating states.
Figure 3:
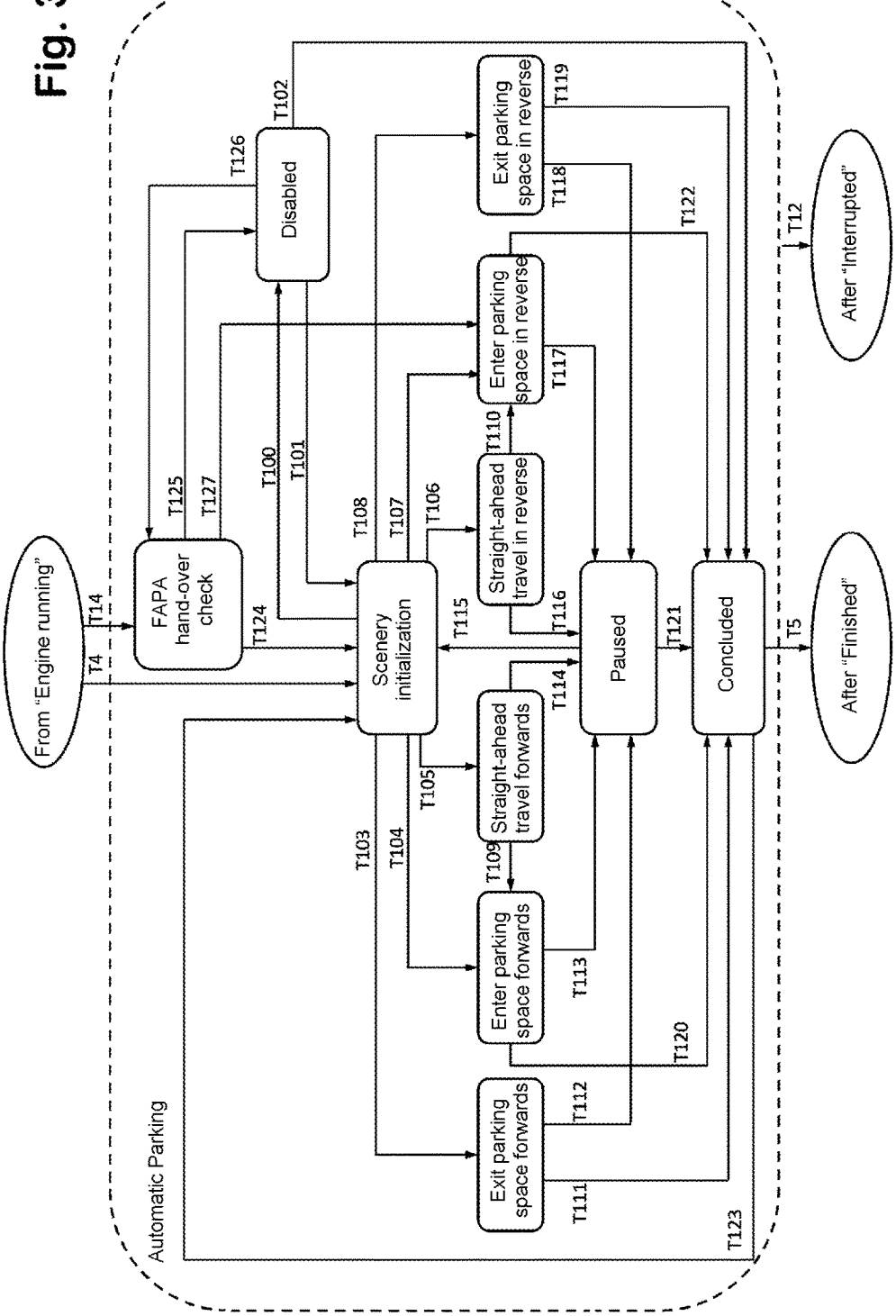
FIG. 3 depicts a detailed block diagram of operating states and possible transitions between them.

The operating states of the parking assistant that are shown in FIGS. 2 and 3 relate to a vehicle 1 with an internal-combustion engine, or, in at least one other embodiment, an electric motor or other vehicle propulsion systems. If the parking assistant is started via the remote control, in FIG. 2 there are two cases: the internal-combustion engine either has stopped or is running. Where appropriate, the ignition and the starter are actuated. If the engine is running, the automatic parking is implemented, as represented in more detail in FIG. 3, but under certain conditions—such as, for example, an obstacle in the travel path—the automatic parking is interrupted, whereupon the automatic parking enters a waiting state that the driver can cancel by remote-controlled resetting of the vehicle 1.

In FIG. 3 a scenery initialization is implemented either immediately or, where appropriate, only after a hand-over check with respect to a fully assisted parking procedure (FAPA=Full Assisted Parking), in which case the remote-controlled parking procedure, to which all other blocks in FIG. 3 relate, is disabled under certain circumstances.

The scenery initialization is normally followed by free running precisely straight ahead, forwards or in reverse, depending upon the current situation, and after a brief stop there follows directly, via the transitions T109 and T110, respectively, an automatic forward or reverse parking procedure corresponding to a parking trajectory that is calculated for the parking-space gateway that is ascertained by an environment sensor system during the straight-ahead ride.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. An automatic parking method comprising:
   stopping a vehicle ahead of a parking space in a position suitable for a direct parking procedure;
   activating a remote control to drive the vehicle a distance straight ahead;
   ascertaining, via an environment sensor system, a parking space gateway during the activating;
   calculating, by a computing device, a parking trajectory based on the parking space gateway;
   stopping the vehicle at an end of the distance; and
   steering the vehicle into a position corresponding to the parking trajectory and the parking space.

2. The method as claimed in claim 1 further comprising:
   checking, during stopping and at a standstill, the dimensions of the parking space detected by the environment sensor system to match the parking space gateway with the dimensions.

3. The method as claimed in claim 1 further comprising:
   measuring the distance straight ahead during ascertaining the parking space gateway.

4. The method as claimed in claim 1 further comprising:
   setting, automatically, the vehicle in motion at the end of the distance, and driving, automatically, into the parking space, in response to recognizing the dimensions of the parking space as appropriate.

5. The method as claimed in claim 1 further comprising:
   in response to a driver command, setting, automatically, the vehicle in motion at the end of the distance to drive into the parking space.

6. The method as claimed in claim 1, wherein:
   the environment sensor system includes ultrasonic sensors.

7. The method as claimed in claim 1, wherein:
   the environment sensor system defines a range within 2 to 3 meters.

8. A vehicle parking assistant for a vehicle comprising:
   a remote control configured to drive the vehicle a distance straight ahead;
   an environment sensor system configured to ascertain a parking space gateway for a parking space during the drive straight ahead; and
   a park assist system configured to calculate a parking trajectory based on the parking space gateway, stop the vehicle at an end of the distance, and steer the vehicle into a position corresponding to the parking trajectory and the parking space.

9. The vehicle parking assistant as claimed in claim 8, wherein the park assist system is further configured to check, while at a standstill, dimensions of the parking space gateway to match the parking space gateway with the dimensions.

10. The vehicle parking assistant as claimed in claim 9, wherein the park assist system is further configured to, in response to the check of the dimensions of the parking space as appropriate, set the vehicle in motion at the end of the distance, and drive into the parking space.

11. The vehicle parking assistant as claimed in claim 8, wherein the park assist system is further configured to, in response to a driver command via the remote control, set the vehicle in motion at the end of the distance to drive into the parking space.

12. The vehicle parking assistant as claimed in claim 8, wherein the environment sensor system includes ultrasonic sensors having a range of 2 to 3 meters.

13. A vehicle comprising:
   a parking assistant configured to, in response to activation of a remote control to drive a distance straight ahead and ascertaining of a parking space gateway via an environment sensor system during the drive straight ahead, calculate a parking trajectory based on the parking space gateway, stop the vehicle at an end of the distance, and steer the vehicle into a position corresponding to the parking trajectory and the parking space.

14. The vehicle as claimed in claim 13, wherein the parking assistant is further configured to check, while at a standstill, dimensions of the parking space gateway to match the parking space gateway with the dimensions.

15. The vehicle as claimed in claim 14, wherein the park assistant is further configured to, in response to the check of the dimensions of the parking space as appropriate, set the vehicle in motion at the end of the distance, and drive into the parking space.

16. The vehicle as claimed in claim 13, wherein the environment sensor system is further configured to measure the distance straight ahead during ascertaining the parking space gateway.

17. The vehicle as claimed in claim 13, wherein the park assistant is further configured to, in response to a driver command via the remote control, set the vehicle in motion at the end of the distance to drive into the parking space.

18. The vehicle as claimed in claim 13, wherein the environment sensor system includes ultrasonic sensors having a range of 2 to 3 meters.

* * * * *